(12) United States Patent
Kamo

(10) Patent No.: US 11,443,434 B2
(45) Date of Patent: Sep. 13, 2022

(54) IMAGE PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Aoi Kamo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/892,307

(22) Filed: Jun. 4, 2020

(65) Prior Publication Data
US 2021/0104047 A1  Apr. 8, 2021

(30) Foreign Application Priority Data
Oct. 3, 2019  (JP) .............................. JP2019-182729

(51) Int. Cl.
| | |
|---|---|
| *G06T 7/11* | (2017.01) |
| *G06T 7/70* | (2017.01) |
| *G06V 10/46* | (2022.01) |
| *G06K 9/62* | (2022.01) |
| *G06T 3/00* | (2006.01) |
| *G06V 10/25* | (2022.01) |
| *G06V 10/44* | (2022.01) |

(52) U.S. Cl.
CPC .............. *G06T 7/11* (2017.01); *G06K 9/6201* (2013.01); *G06T 3/0012* (2013.01); *G06T 7/70* (2017.01); *G06V 10/25* (2022.01); *G06V 10/44* (2022.01); *G06V 10/462* (2022.01); *G06T 2207/20132* (2013.01)

(58) Field of Classification Search
CPC ... G06T 7/11; G06T 7/70; G06T 2207/20132; G06T 3/0012; G06K 9/4671; G06K 9/6201; G06V 10/25; G06V 10/44; G06V 10/462
USPC ........................................................ 382/103
See application file for complete search history.

(56) References Cited

U.S. PATENT DOCUMENTS

| | | | |
|---|---|---|---|
| 7,634,135 B2 | 12/2009 | Fukui et al. | |
| 10,169,673 B2 * | 1/2019 | Yamanaka | ........... G06K 9/4671 |
| 2006/0093184 A1 * | 5/2006 | Fukui | ................. G06K 9/00234 |
| | | | 382/103 |
| 2015/0189186 A1 * | 7/2015 | Fahn | .................. H04N 5/23222 |
| | | | 348/239 |

(Continued)

FOREIGN PATENT DOCUMENTS

| | | | | |
|---|---|---|---|---|
| CN | 104268827 A | * | 1/2015 | |
| JP | 2004228994 A | * | 8/2004 | ............. G06T 11/60 |
| JP | 2006133990 | | 5/2006 | |

(Continued)

*Primary Examiner* — Ping Y Hsieh
*Assistant Examiner* — Daniella M. DiGuglielmo
(74) *Attorney, Agent, or Firm* — JCIPRNET

(57) ABSTRACT

An image processing apparatus includes an input unit that inputs an image, and a processor configured to read out a program stored in a memory, and executes the program. The processor is configured to detect an intended subject from the input image by a first detection method, set an intended subject region for the detected intended subject, detect the intended subject from the input image by a second detection method different from the first detection method, and update the set intended subject region by using a detection result of the second detection method.

9 Claims, 7 Drawing Sheets

(56) References Cited

U.S. PATENT DOCUMENTS

2015/0324995 A1\* 11/2015 Yamamoto ........... G06K 9/3233
382/173

FOREIGN PATENT DOCUMENTS

| JP | 4052128 | 2/2008 |
|----|---------|--------|
| JP | 4052128 B2 \* | 2/2008 |
| JP | 2013102814 | 5/2013 |

\* cited by examiner

IMAGE PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-182729 filed Oct. 3, 2019.

BACKGROUND

(i) Technical Field

The present invention relates to an image processing apparatus, and a non-transitory computer readable medium storing a program.

(ii) Related Art

In the related art, various technologies for trimming an image are proposed.

JP4052128B describes an image trimming apparatus that trims an image. The image trimming apparatus includes image reading means for reading an image to be trimmed, attention region calculation means for separating the image to be trimmed into a plurality of regions, obtaining a degree of attention for each of the divided regions, and calculating an attention region of the image, object storage means for storing a model of an object learned in advance for a predetermined object, object index calculation means for calculating an index of the object appearing in the image based on the model of the object stored in the object storage means, trimming method storage means for storing a trimming method, trimming method decision means for deciding the trimming method according to the degree of attention obtained by the attention region calculation means and the object index obtained by the object index calculation means, and trimming means for trimming the image according to the trimming method decided by the trimming method decision means.

JP2013-102814A describes a medical image processing apparatus that performs image processing on a radiation image obtained by performing radiographic imaging with a diagnosis target part of a human body as a subject.

The medical image processing apparatus includes region decision means for deciding, as an image region to be cut out from the radiation image, an image region which is a partial region of an irradiation field region of the radiation image and includes the diagnosis target part by analyzing the radiation image, and trimming means for generating an image having an image size smaller than a size of the radiation image by cutting out the decided image region. The region decision means sets a candidate region of the image region to be cut out from the radiation image within the irradiation field region of the radiation image, determines whether or not the set candidate region is an image region having no loss in the diagnosis target part, and decides the candidate region as the image region to be cut out from the radiation image in a case where it is determined that the candidate region is the image region having no loss in the diagnosis target part. The region decision means sets the candidate region of the image region to be cut out from the radiation image within the irradiation field region of the radiation image, determines whether or not the set candidate region is the image region having no loss in the diagnosis target part, sequentially sets, as the candidate region, regions smaller than the set candidate region in a case where it is determined that the candidate region is the image region having no loss in the diagnosis target part, determines whether or not the set candidate region is the image region having no loss in the diagnosis target part, and decides, as the image region to be cut out from the radiation image, the candidate region set immediately before the candidate region determined to having the loss in the diagnosis target part.

SUMMARY

Incidentally, in a business flow of product imaging, there may be an attempt to perform trimming processing for cutting out an image from a minimum rectangular frame in which an intended subject is not cut off while removing an unnecessary background such as a white background mixed at the time of imaging or an unnecessary object such as a dark curtain, a tag, or a clip appearing at an edge.

However, particularly in a case where the model as the subject is posing with his or her legs spread or is holding a bag, the edge of the intended subject may protrude outside a subject region estimated by object detection. Therefore, in a case where the subject region is estimated only based on a result of the object detection and the trimming processing of the image is executed, the intended subject is cut off.

In contrast, although a method for performing the trimming processing by providing a region having a uniform margin to the object detection result and estimating the subject region is also considered, the image may include unnecessary margins and unnecessary objects present around the intended subject in some intended subjects.

Aspects of non-limiting embodiments of the present disclosure relate to an image processing apparatus and a non-transitory computer readable medium storing a program that are capable of providing a technology of setting an extraction region that is not cut off while removing unnecessary backgrounds and unnecessary objects for an intended subject present in an image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including an input unit that inputs an image, and a processor configured to read out a program stored in a memory, and executes the program. The processor is configured to detect an intended subject from the input image by a first detection method, set an intended subject region for the detected intended subject, detect the intended subject from the input image by a second detection method different from the first detection method, and update the set intended subject region by using a detection result of the second detection method.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Figure 1:
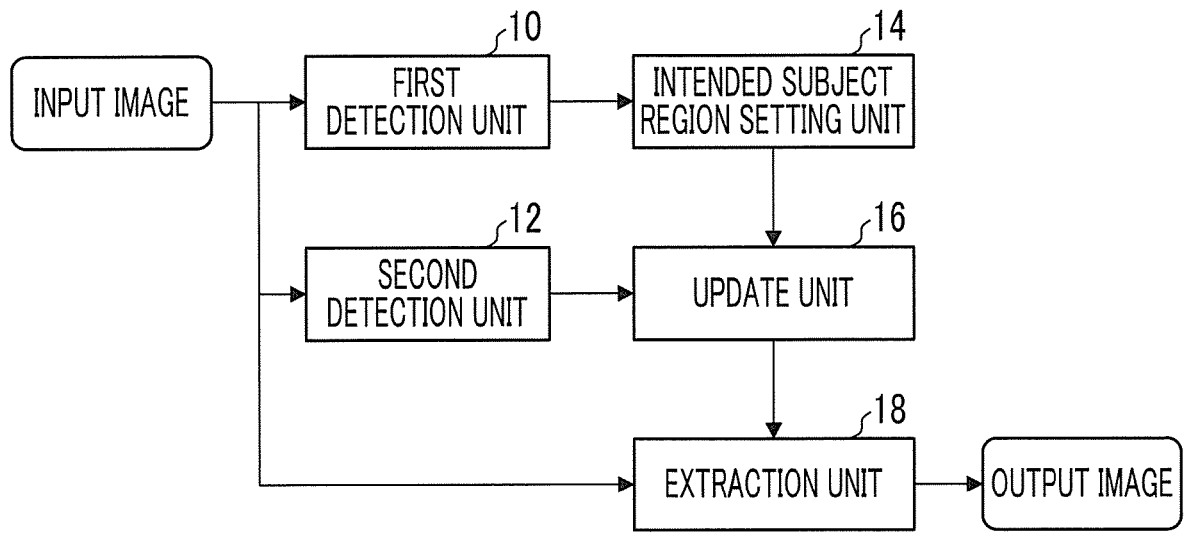
FIG. 1 is a functional block diagram of an image processing apparatus according to an exemplary embodiment.

FIG. 1 is a functional block diagram of an image processing apparatus according to this exemplary embodiment. The image processing apparatus includes, as functional blocks, a first detection unit 10, a second detection unit 12, an intended subject region setting unit 14, an update unit 16, and an extraction unit 18.

The first detection unit 10 inputs an input image, and detects an intended subject from the input image by a first detection method. The input image is, for example, an image data captured image such as a photograph by using a digital camera, but is not limited thereto. A known object detection algorithm can be used as the first detection method. For example, in a case where the intended subject to be detected is a person, the subject is detected by using pattern matching with a person template. Alternatively, a specific color of the intended subject may be focused on, and the subject may be detected by using the specific color. In the first detection method, a position of the intended subject in the input image may be detected with a predetermined accuracy. The first detection unit 10 outputs a detection result to the intended subject region setting unit 14.

The intended subject region setting unit 14 sets an intended subject region based on the detection result from the first detection unit 10. The intended subject region is set as a region having a predetermined shape, for example, a rectangular region. In a case where a size of the rectangular region, that is, a size in an x direction and a size in a y direction in a case where a plane in the input image is an x-y plane is set based on the detection result from the detection unit 10. Basically, a rectangular region in an object presence region indicated by the detection result from the first detection unit 10 is set as the intended subject region. More specifically, the largest rectangular region that can be obtained in the object presence region is set as the intended subject region. Therefore, for example, in a case where the shape of the intended subject is rectangular, an appropriate intended subject region along the shape of the intended subject can be set as the intended subject region, but in a case where the shape of the intended subject is not rectangular, for example, in a case where a model as the subject is posing while spreading his or her arms and legs, a rectangular portion including the head and the body except for a part of the arms and legs can be set as the intended subject region. The intended subject region setting unit 14 outputs the set intended subject region to the update unit 16.

The second detection unit 12 inputs an input image, and detects an intended subject from the input image by a second detection method. The second detection method is a detection method different from the first detection method in the first detection unit 10. For example, the intended subject is detected by detecting a salient region indicating a region in which a person is highly likely to pay attention to an input image at the time of viewing this input image based on features of this input image in the input image. The salient region can be detected by a known method, and can be detected by using, for example, a model using a "feature integration theory" based on a cognitive mechanism or machine learning. In this model using the "feature integration theory", a visual field image of a person is processed in parallel for each feature (luminance, color, or inclination), and these features are finally integrated. Basic image features such as luminance, color, and inclination are independently obtained for a target image, and are finally weighted and integrated. A frequency distribution obtained by the weighting and integrating is used as a saliency map, and a region of the image in which saliency is high is detected. Alternatively, the intended subject may be detected by binarizing the input image. The second detection unit 12 outputs a detection result to the update unit 16.

The update unit 16 inputs the intended subject region from the intended subject region setting unit 14 and the detection result from the second detection unit 12, and updates the intended subject region by using the detection result from the second detection unit 12. Specifically, since there is a concern that the intended subject is cut off in the intended subject region set by the intended subject region setting unit 14, the rectangular region is expanded such that the intended subject region is not cut off by using the detection result from the second detection unit 12. Of course, the intended subject region is simply expanded, and thus, the intended subject is not cut off. However, the intended subject region includes unnecessary background and unnecessary objects, an expansion range is as small as possible. In other words, the expansion range of the intended subject region is limited by the detection result from the second detection unit 12, and an upper limit of the expansion is decided. More specifically, the update unit 16 expands the intended subject region by newly adding pixels which are adjacent to the intended subject region and are detected by the second detection unit 12 to pixels of the intended subject region by using the detection result from the second detection unit 12. The intended subject region updated by the update unit 16 may not be the rectangular shape, but has a shape that matches the shape of the original intended subject. The update unit 16 outputs the updated intended subject region to the extraction unit 18.

The extraction unit 18 performs trimming processing for extracting and cutting out the intended subject from the input image by using the updated intended subject region from the update unit 16, and outputs the processed image as an output image. That is, the extraction unit 18 sets a rectangular frame (trimming frame) for trimming by using the updated intended subject region from the update unit 16, trims the input image by using the set trimming frame, and generates the output image.

Although it has been described in FIG. 1 that the first detection unit 10 and the second detection unit 12 are separate functional blocks, these units are shown for the sake of convenience in order to show that the detection methods are different from each other, and may not be physically different components. These units may detect the subjects by two detection methods using a single member or different components. Although the first detection method and the second detection method are different from each other, the first detection method is a detection method for setting the intended subject region for the intended subject with a first accuracy, and the second detection method is a detection method for updating the intended subject region with a second accuracy higher than the first accuracy.

Although FIG. 1 shows the first detection unit 10 and the second detection unit 12, a third detection unit and a fourth detection unit using different detection methods may be provided as needed.

Figure 2:
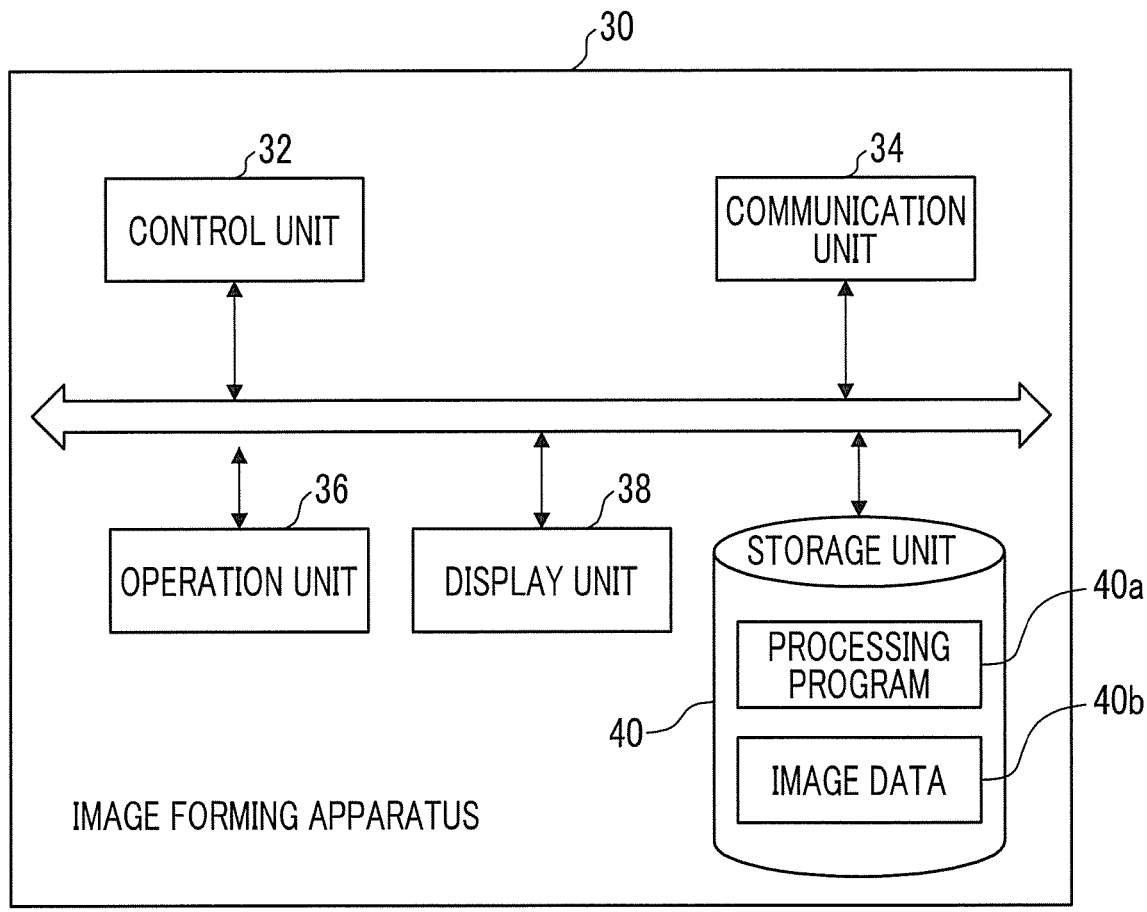
FIG. 2 is a block diagram showing a configuration of the image processing apparatus according to the exemplary embodiment.

FIG. 2 is a configuration block diagram of the image processing apparatus according to the exemplary embodiment. The image processing apparatus 30 is configured to include a computer, and specifically includes a control unit 32, a communication unit 34, an operation unit 36, a display unit 38, and a storage unit 40.

The control unit 32 is configured to include a processor such as a central processing unit (CPU), and realizes functions of the functional blocks shown in FIG. 1 by reading out and executing a processing program stored in the storage unit 40. That is, the processor detects the intended subject from the input image by the first detection method, sets the intended subject region for the detected intended subject, detects the intended subject from the input image by using the second detection method different from the first detection method, and updates the set intended subject region by using the detection result of the second detection method. The trimming processing for extracting and cutting out the intended subject from the input image by using the updated intended subject region is performed, and the processed image is output as the output image.

The communication unit 34 is a communication module that realizes communication connection to a communication line such as a public line or a dedicated line. The input image may be input via the communication unit 34.

The operation unit 36 is a user interface such as a keyboard and a mouse. The operation unit 36 is not limited to a physical button, and may be a software button such as a touch button displayed on the display unit 38.

The display unit 38 is a liquid crystal display or an organic EL display, and displays various data according to a control command from the control unit 32. The various data includes the input image, the intended subject region, the updated intended subject region, the trimming frame, and the output image.

The storage unit 40 is configured to include a hard disk or a flash memory. The storage unit 40 stores a processing program 40a and image data 40b. The image data 40b includes the input image, the detection result detected by the first detection method, a detection defect detected by the second detection method, the intended subject region, the updated intended subject region, the trimming frame, and the output image.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively.

Figure 3:
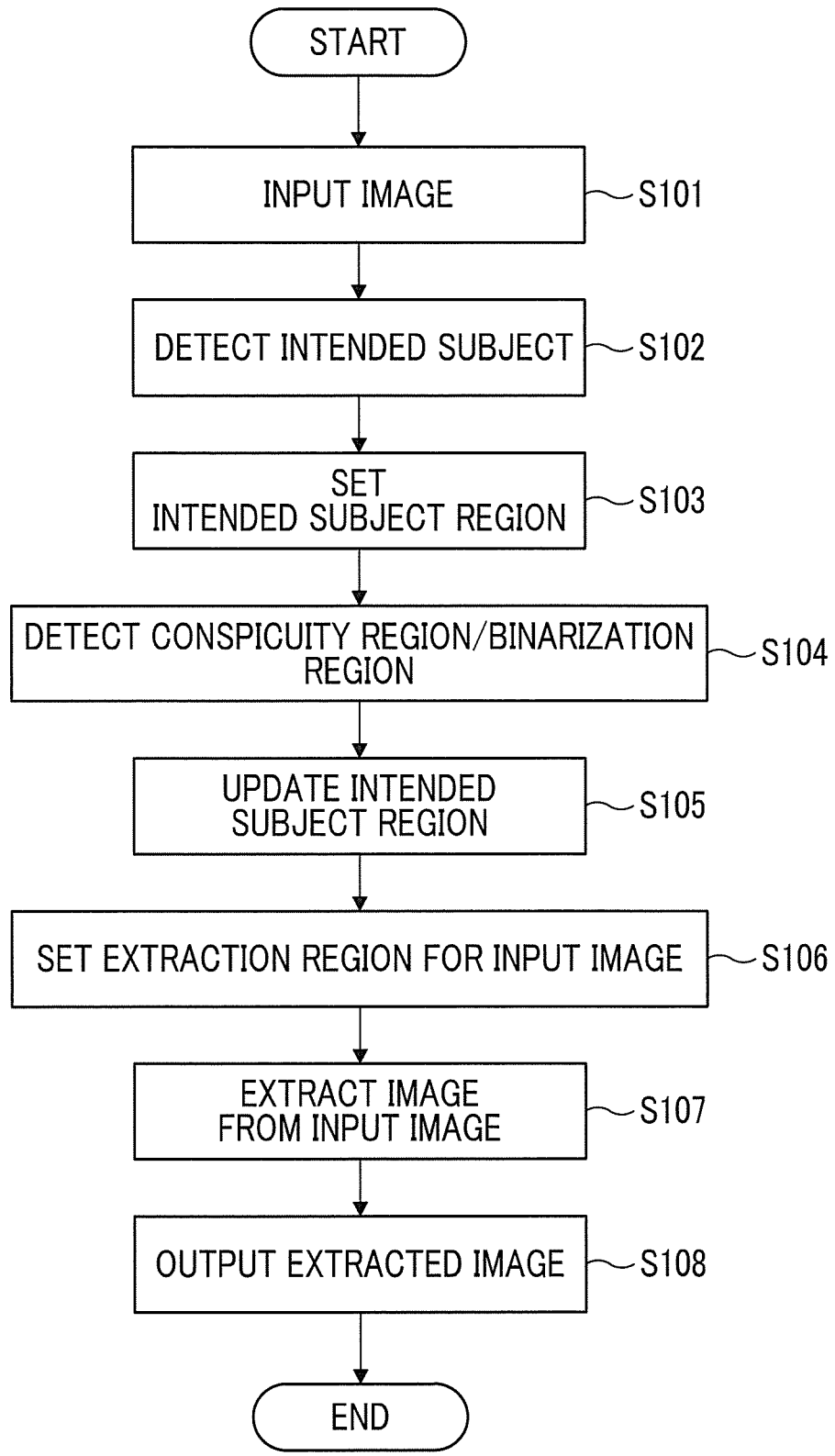
FIG. 3 is a processing flowchart of the image processing apparatus according to the exemplary embodiment.

FIG. 3 is a processing flowchart of the image processing apparatus 30 and a processing flowchart of a processor constituting the control unit 32.

First, the processor inputs an image to be trimmed (S101). That is, the image stored in the storage unit 40 is read out from the storage unit 40 via the communication unit 34. The image may be transferred from an external memory to the storage unit 40 by operating the operation unit 36 by a user.

Subsequently, the processor detects the intended subject from the input image by the first detection method (S102). The processor detects the intended subject by, for example, pattern matching or detection of a specific color.

Subsequently, the processor sets the intended subject region based on the detection result (S103). The intended subject region is set as the rectangular region within the intended subject presence region detected by the first detection method. After the intended subject region is set, the processor stores the intended subject region in the storage unit 40.

Subsequently, the processor detects the intended subject from the input image by using the second detection method different from the first detection method (S104). The processor detects by, for example, at least one of the salient region detection or the binarization detection. Here, for example, it is assumed that the salient region is detected. In a case where the salient region is detected from the input image, the processor stores the salient region in the storage unit 40.

Subsequently, the processor reads out the intended subject region and the salient region stored in the storage unit 40, and updates the intended subject region by expanding the intended subject region by using the salient region (S105). That is, in a case where the salient region is adjacent to the intended subject region, the processor updates the intended subject region by adding the adjacent region to the intended subject region. The processor may update the intended subject region by expanding the intended subject region by using a binarization region, or may update the intended subject region by expanding the intended subject region by using both the salient region and the binarization region. In the latter case, for example, the processor may update the intended subject region by expanding the intended subject region by using the salient region, and further update the updated intended subject region by expanding the updated intended subject region by using the binarization region. The processor stores the updated intended subject region in the storage unit 40.

Subsequently, the processor reads out the updated intended subject region from the storage unit 40, and sets an extraction region, that is, the trimming frame, by using the updated intended subject region (S106). The processor sets the trimming frame by calculating coordinates at an upper left vertex and coordinates at a lower right vertex of the trimming frame by using a minimum value of x coordinates and a minimum value of y coordinates of the updated intended subject region and a maximum value of the x coordinates and a maximum value of the y coordinates of the updated intended subject region. The processor stores the set trimming frame in the storage unit 40.

Subsequently, the processor executes the trimming processing by reading out the trimming frame from the storage unit 40 and applying the trimming frame to the input image (S107). The extracted image, that is, the trimmed image is stored as the output image in the storage unit 40, and is output to the display unit 38 for display.

The processing of S101 to S108 shown in FIG. 3 may be sequentially performed by one processor, or may be performed by a plurality of processors in a distributed manner. For example, the processing of S102 and the processing of S104 may be performed in parallel by different processors.

Hereinafter, each processing will be specifically described.

Figure 4:
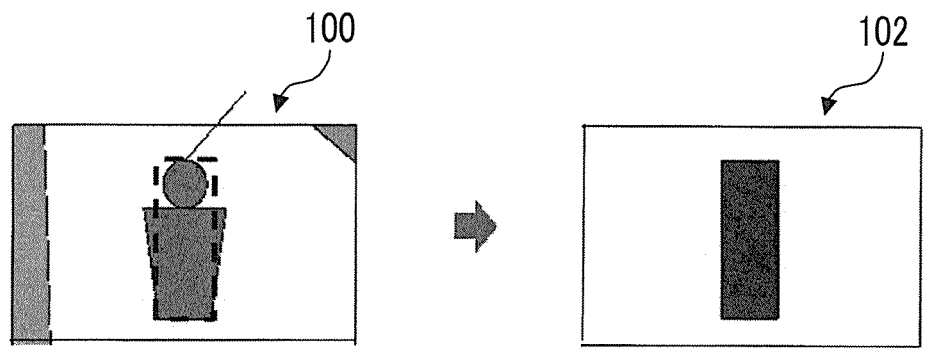
FIG. 4 is an explanatory diagram of setting of an intended subject region according to the exemplary embodiment.

FIG. 4 schematically shows the processing of S102 and S103. In a case where an input image 100 is input, the processor sets an intended subject region 102 by detecting the intended subject by the first detection method and setting the rectangular region (indicated by a broken line in the diagram) within a presence region of the detected intended subject. The intended subject region 102 can be defined as a region having a rectangular shape and a size substantially equal to the size of the intended subject. In a case where the intended subject is a person, since an outline may not be rectangular and can be expressed as a composite shape including the head and the body as shown in the diagram, the intended subject region 102 having the rectangular shape may not match the intended subject.

Therefore, in a case where the input image is trimmed in the set intended subject region 102, a part of the intended subject is cut off. This case means that the accuracy of the trimming is decided depending on the accuracy of detecting the intended subject by the first detection method. Meanwhile, it is considered that the intended subject is detected by the first detection method, a region having a uniform margin is set on the detected intended subject, and the intended subject region is set. Thus, the intended subject can be prevented from being cut off. However, unnecessary backgrounds and unnecessary objects present near the intended subject are mixed. Therefore, it is necessary to expand the intended subject region such that unnecessary backgrounds and unnecessary objects are not included as much as possible while preventing the intended subject from being cut off.

Figure 5:
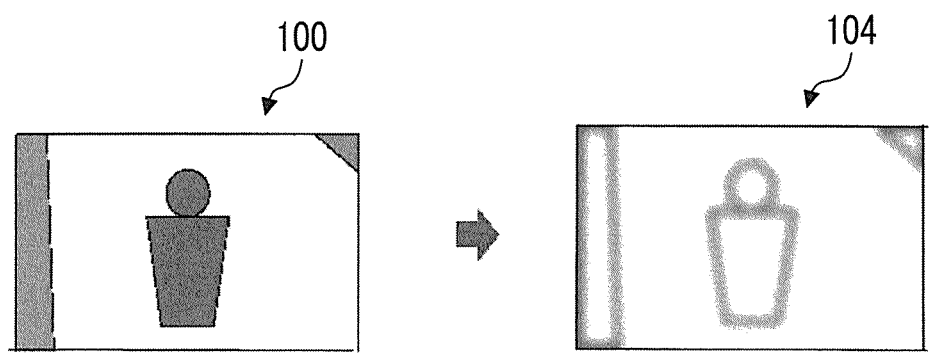
FIG. 5 is an explanatory diagram of detection of a saliency salient region according to the exemplary embodiment.

FIG. 5 schematically shows the processing of S104. In a case where the input image 100 is input, the processor detects the intended subject by the second detection method. Specifically, the salient region indicating a degree of attention of a person is detected. Although any algorithm for detecting the salient region is used, the input image 100 is divided into a plurality of sub-regions (partial regions), and a saliency feature value related to at least one of a value or the number of pixels included in each sub-region is calculated for each of the plurality of sub-regions. The sub-regions are sequentially selected as a salient sub-region, and a set D(T) of other sub-regions (other than a salient sub-region) in contact with a salient sub-region T is selected. That is, the sub-region to which adjacent pixels of eight adjacent regions (eight regions of upper left, upper, upper right, left, right, lower left, lower, and lower right) belong is investigated for each pixel included in the salient sub-region T, and in a case where this sub-region is not the salient sub-region T, the sub-region to which the adjacent pixels belong is added to the set D(T) of other sub-regions adjacent thereto. In this case, the number of adjacent pixels in the salient sub-region, that is, the number of pixels related to a boundary between the salient sub-region and another sub-region may be counted for each sub-region included in D(T), and the sub-region of which the number of adjacent pixels is smaller than a predetermined threshold value may be removed from D(T). The count value may be stored in the storage unit 40 in association with each sub-region included in D(T).

Subsequently, a feature vector $F_T=(l_T, a_T, b_T, s_T)$ related to the salient sub-region T is created.

Here, $l_T$, $a_T$, and $b_T$ mean an average (center of gravity) as a statistic value of the L*a*b values of the pixels included in the salient sub-region T, and $s_T$ indicates the number of pixels included in the salient sub-region T.

An average feature vector FD(T)=(lD(T), aD(T), bD(T), sD(T)) for the sub-regions included in the set D(T) is generated. Here, lD(T) and the like mean the average of the element values of the feature vector in each sub-region included in the set D(T). ‖D(T)‖ is the number of sub-regions (the number of adjacent sub-regions) included in the set D(T). The processor calculates a saliency feature value element S(T, f) for a feature element f (one of l, a, b, and s) related to the salient sub-region T by the following [Expression 1].

$$S(T, f) = Norm\left[\frac{\sum_{D \in D(T)} (f_T - f_D)^2}{\|D(T)\|}\right] \quad \text{[Expression 1]}$$

That is, the saliency feature value element is basically obtained by dividing the sum of square values of a difference between this element and the corresponding element in each adjacent sub-region by the number of adjacent sub-regions (‖D(T)‖) for one of the elements of the feature values of the salient sub-region. Here, in a case where the difference between the elements is calculated, a weight based on the number of pixels present at the boundary between the salient sub-region and another sub-region may be multiplied by a value of the difference between the elements, and may be summed up. This saliency feature value element is normalized such that a minimum value is zero and a maximum value is 100 (in the Expression, Norm indicates that this normalization is performed). The processor calculates a saliency feature value element S(T, D) for a peripheral region of the salient sub-region T by the following [Expression 2].

$$S(T, D) = Norm\left[\sum_f S(T, f)\right] \quad \text{[Expression 2]}$$

Here, Σ indicates that the sum of each element is calculated. In this case, the saliency feature values are normalized such that the minimum value is zero and the maximum value is 100.

This salient feature value element S(T, D) is a value that becomes larger as the salient sub-region becomes visually more conspicuous than the peripheral sub-regions. Here, the color and the size are used as the feature vectors, but quantities indicating shapes or curvatures may be included in the feature vectors. For example, JP2006-133990A describes an image processing apparatus that calculates a saliency feature value.

The processor detects the salient region from the input image 100 based on the saliency feature value calculated for each sub-region. That is, the sub-region that is equal to or larger than a predetermined threshold value is detected as a salient region 104. FIG. 5 shows a scene in which a left portion, an upper right portion, and a center portion of the input image 100 are detected as the salient region 104.

Figure 6:
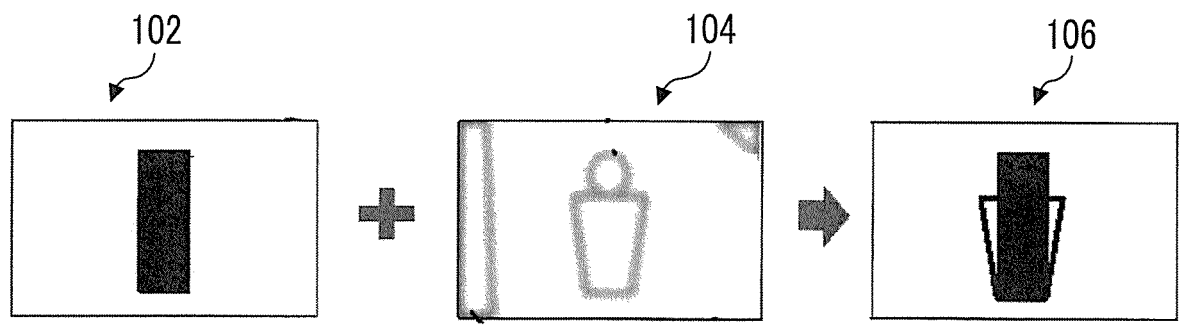
FIG. 6 is an explanatory diagram (part 1) of updating of the intended subject region according to the exemplary embodiment.

FIG. 6 schematically shows the processing of S105. An updated intended subject region 106 is generated by adding the intended subject region 102 set in S103 and the salient region 104 detected in S104, that is, performing a logical sum operation. Since the updated intended subject region 106 is expanded by the salient region 104, the intended subject region may not be a rectangular shape, but has a shape corresponding to the salient region 104.

Figure 7:
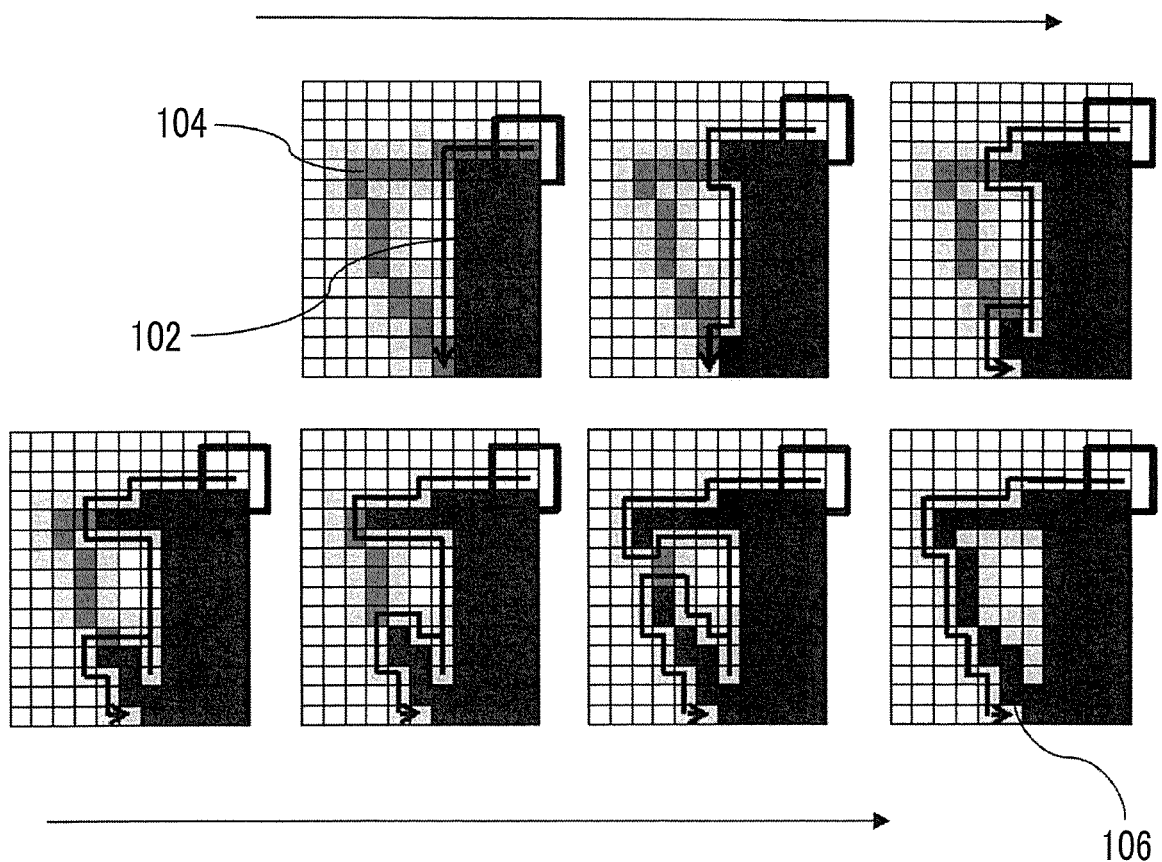
FIG. 7 is an explanatory diagram (part 2) of updating of the intended subject region according to the exemplary embodiment.

FIG. 7 shows the processing of S105 in more detail. The processing proceeds from left to right at an upper row, and the processing further proceeds from left to right at a lower row. The intended subject region 102 set in S103 and the salient region 104 detected in S104 are overlapped, attention is paid to pixels constituting the salient region 104, and an attention pixel is newly added to the intended subject region 102 in a case where pixels adjacent to the attention pixel are the intended subject region 102. For example, in a case where a left side at the upper row is focused on, since lower pixels adjacent to pixels constituting an upper part of the salient region 104 are the intended subject region 102, these pixels are newly added to the intended subject region 102 as shown on a center side of the upper row. As shown on the center side of the upper row, right pixels adjacent to pixels constituting a lower part of the salient region 104 are the intended subject region 102, and these pixels are newly added to the intended subject region 102. By repeating the processing described above, finally, as shown on the right side at the lower row, the salient region 104 is newly added to the intended subject region 102, the intended subject region 102 is expanded, and the updated intended subject region 106 is generated.

Figure 8:
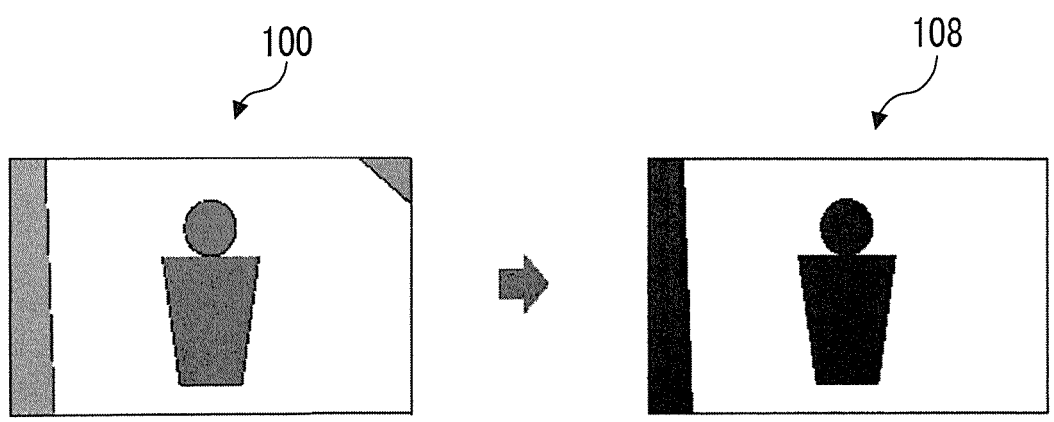
FIG. 8 is an explanatory diagram of binarization according to the exemplary embodiment.

FIG. 8 schematically shows another processing of S104. Processing for binarizing a luminance distribution and a color distribution of the input image 100 by using a certain threshold value is schematically shown. For example, the input image 100 is binarized, and a region of a specific color (for example, a color of orange) is detected as a binarization region 108.

Figure 9:
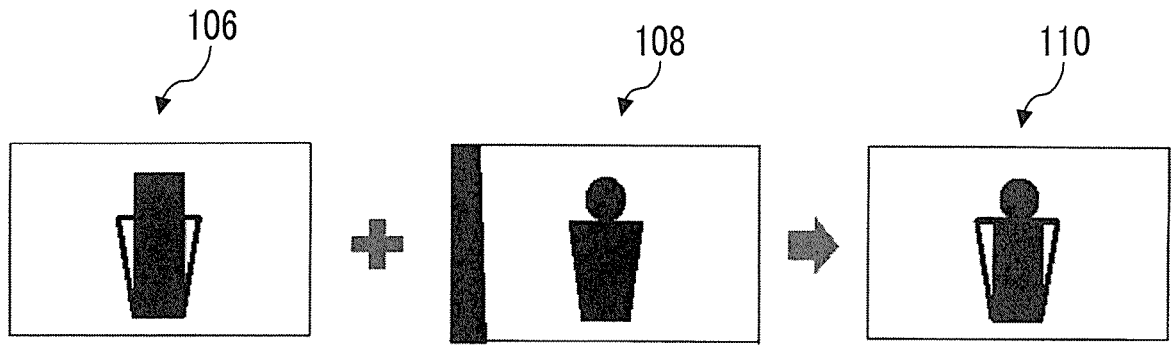
FIG. 9 is an explanatory diagram (part 3) of updating of the intended subject region according to the exemplary embodiment.

FIG. 9 schematically shows another processing of S105. The intended subject region 102 is updated by using the salient region 104 to generate the updated intended subject region 106, and an updated intended subject region 110 is further generated by expanding the updated intended subject region 106 by using the binarization region 108. Specifically, the updated intended subject region 106 is expanded by calculating the logical sum of the updated intended subject region 106 and the binarization region 108. It can be seen from comparison of FIG. 9 with FIG. 6 that the intended subject region 110 in FIG. 9 is further expanded than the intended subject region 106 of FIG. 6 and a region corresponding to the head of the person is particularly expanded.

Figure 10:
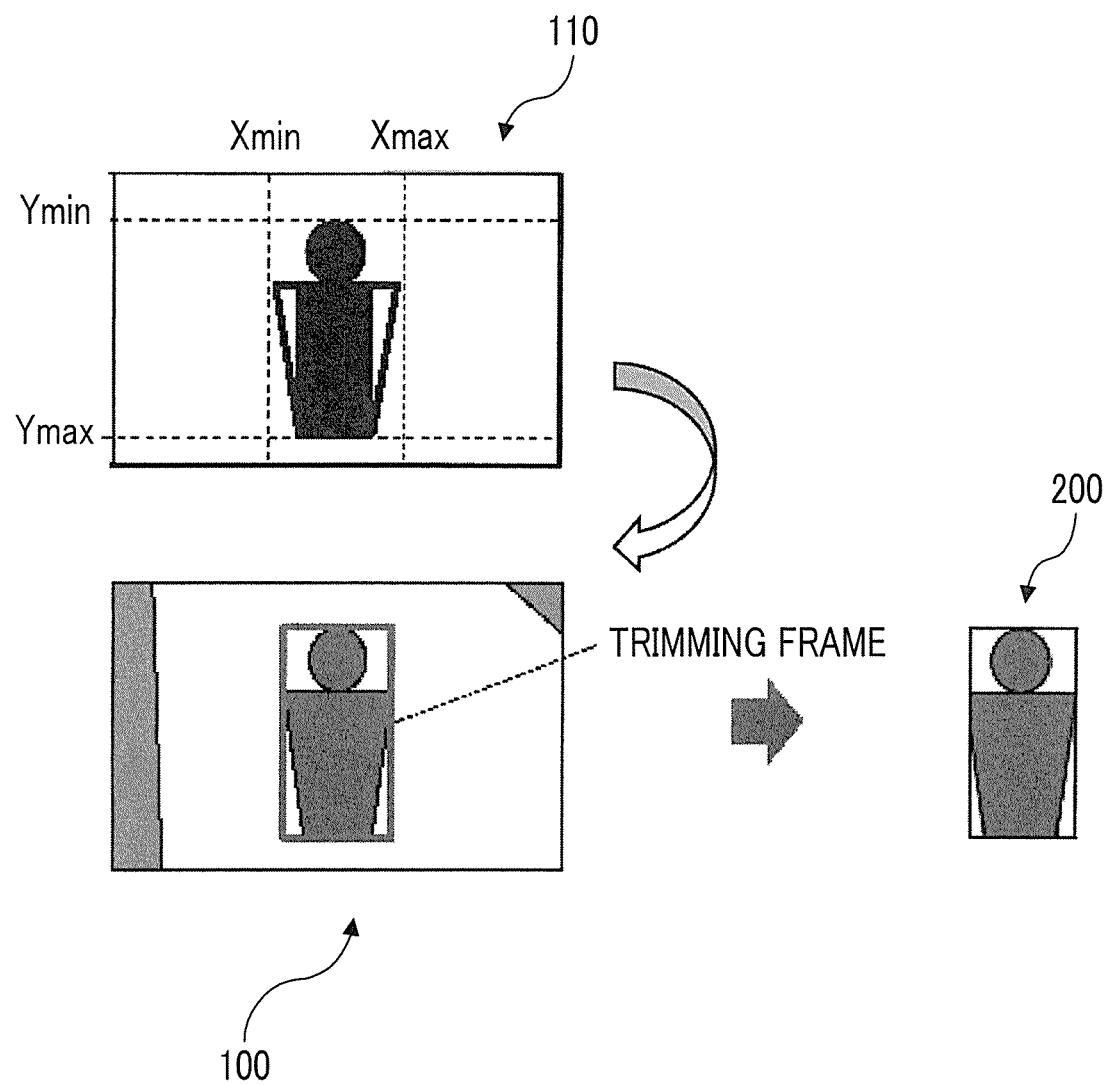
FIG. 10 is an explanatory diagram of trimming processing according to the exemplary embodiment.

FIG. 10 schematically shows the processing of S106 and S107. This processing is processing for setting the extraction region, that is, the trimming frame based on the updated intended subject region 110 shown in FIG. 9. In the updated intended subject region 110, a minimum value Xmin of the x coordinates, a minimum value Ymin of the y coordinates, a maximum value Xmax of the x coordinates, and a maximum value Ymax of the y coordinates are detected, and a rectangular trimming frame having these two points as the upper left vertex and the right lower vertex is set. This trimming frame is a rectangular region circumscribing the updated intended subject region 110. In a case where the trimming frame is set, the trimming frame is applied to the input image 100, the trimming processing of the input image 100 is executed, and the intended subject is output as an output image 200.

As described above, in this exemplary embodiment, the intended subject region set according to the detection result from the first detection unit 10 is updated by being expanded by using the detection result from the second detection unit 12, and thus, the intended subject is prevented from being cut off, and unnecessary backgrounds and unnecessary object can be prevented from being mixed. The update based on the detection result from the second detection unit 12 is not limited to one time, and the accuracy of setting the intended subject region can be improved by performing the update a plurality of times using different detection results.

Although it has been described in this exemplary embodiment that one intended subject is present in the input image 100, this exemplary embodiment is not limited thereto. A plurality of intended subjects may be present, and the trimming frame can be set from the updated intended subject region by performing the above-described processing for each intended subject and updating the intended subject region.

Although it has been described in this exemplary embodiment that the smallest rectangular frame as possible such that the intended subject is not cut off is set as the trimming frame, the frame is calculated based on the smallest rectangular frame in calculating a frame of another composition, and, for example, a trimming frame that intentionally has a margin twice as large as the intended subject region may be set.

Although it has been described in this exemplary embodiment that the salient region and the binarization are used as the second detection method in the second detection unit 12, this exemplary embodiment is not limited thereto, and edge detection or cutting may be used. The first or second detection method may be used alone, or a plurality of combinations of the first and second detection methods may be used. Examples of combinations of the first detection method and the second detection method are as follows.

(1) Combination of object detection and salient region detection (2) Combination of object detection and binarization region detection (3) Combination of object detection and edge detection (4) Combination of object detection, salient region detection, and binarization region (5) Combination of object detection, salient region detection, and edge detection (6) Combination of object detection, binarization region, and edge detection In this exemplary embodiment, an unnecessary subject region that does not include the intended subject is detected, and thus, the intended subject can also be trimmed by using the unnecessary subject region. Hereinafter, this case will be described.

Figure 11:
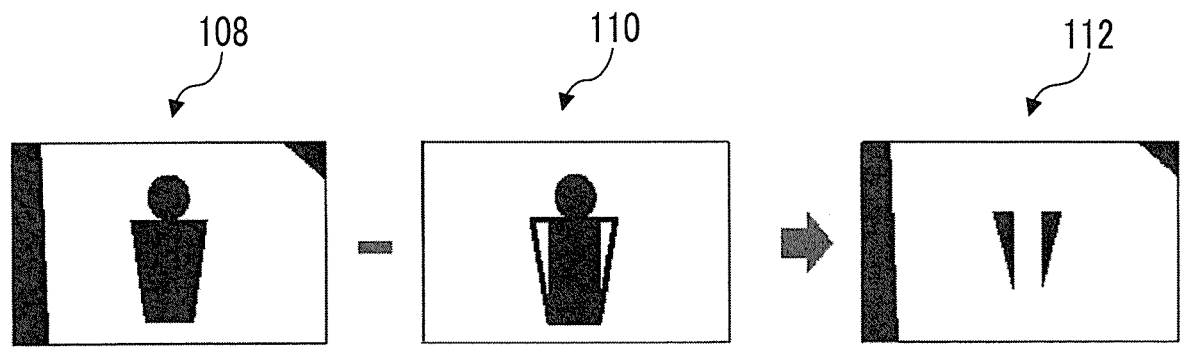
FIG. 11 is an explanatory diagram of setting of an unnecessary subject region according to another exemplary embodiment.

FIG. 11 schematically shows processing for detecting the unnecessary subject region.

The processor calculates an unnecessary subject region 112 by reading out the binarization region 108 shown in FIG. 8 and the updated intended subject region 110 shown in FIG. 9 from the storage unit 40 and subtracting the updated intended subject region 110 from the binarization region 108. The unnecessary subject region is defined as a region outside the intended subject in the binarization region 108.

Figure 12:
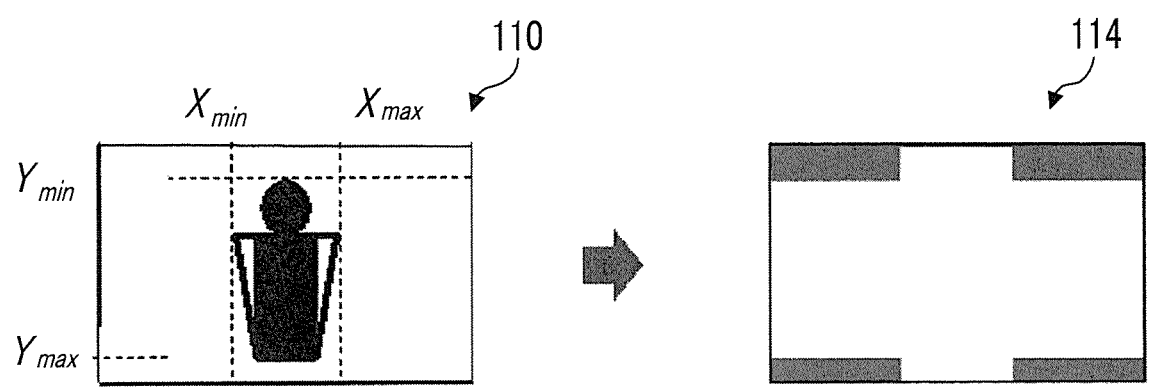
FIG. 12 is an explanatory diagram of a frame in which the intended subject is not cut off in another exemplary embodiment.

FIG. 12 schematically shows another calculation processing of a frame in which the intended subject is not cut off based on the updated intended subject region 110. In the updated intended subject region 110, the minimum value Xmin of the x coordinates, the minimum value Ymin of the y coordinates, the maximum value Xmax of the x coordinates, and the maximum value Ymax of the y coordinates are detected, and the regions defined by the following Expressions are set.

$$X \leq Xmin \text{ and } Y \leq Ymin$$

$$X \geq Xmax \text{ and } Y \leq Ymin$$

$$X \leq Xmin \text{ and } Y \geq Ymax$$

$$X \geq Xmax \text{ and } Y \geq Ymax$$

In this diagram, an unfilled region is a region shown by these inequalities, and is a frame region 114 in which the intended subject is not cut off (not the smallest rectangular region shown in FIG. 10).

Figure 13:
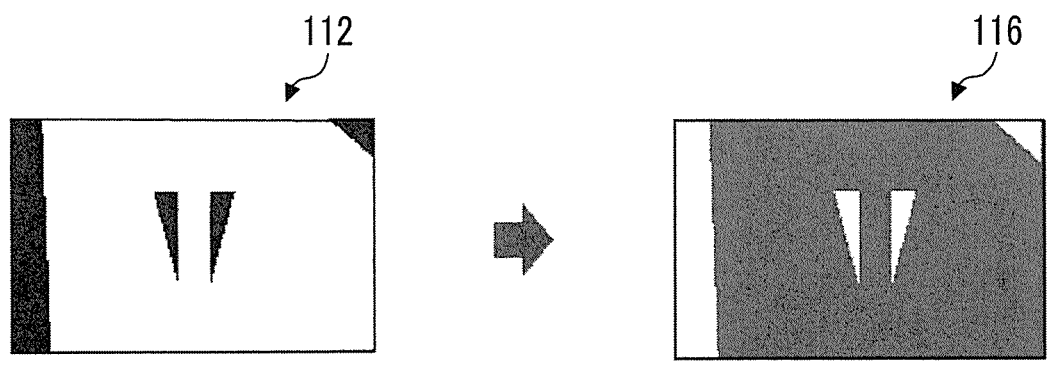
FIG. 13 is an explanatory diagram of a frame in which an unnecessary subject region is not included in another exemplary embodiment.

FIG. 13 schematically shows processing for calculating the frame region that does not include the unnecessary subject region based on the unnecessary subject region 112 shown in FIG. 11. The region excluding the unnecessary subject region 112 (the unfilled region in the drawing) is calculated as a frame region 116 that does not include the unnecessary subject region.

Figure 14:
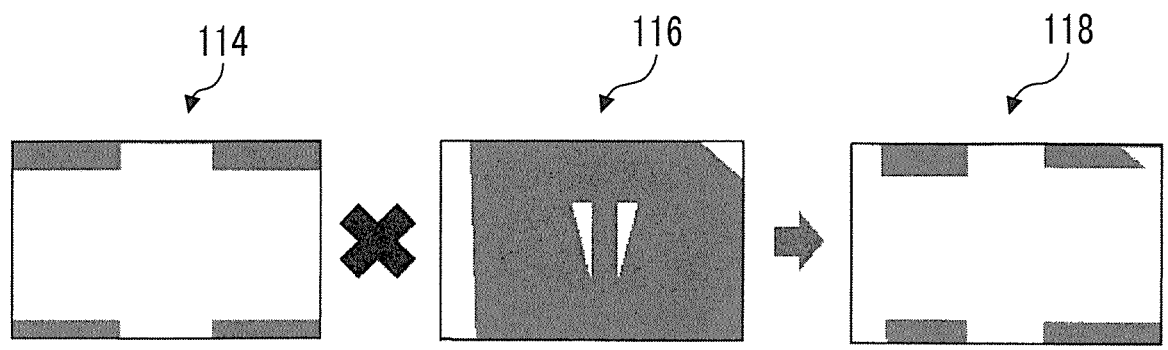
FIG. 14 is an explanatory diagram of setting of a frame in which the intended subject is not cut off and the unnecessary subject region is not included in another exemplary embodiment.

FIG. 14 schematically shows processing for calculating the frame region based on the two regions shown in FIGS. 12 and 13 in which the intended subject region is not cut off and the unnecessary subject region is not included. The processor calculates the frame region 118 in which the intended subject is not cut off and the unnecessary subject region is not included by calculating the logical product of the frame region 114 in which the intended subject shown in FIG. 12 is not cut off and the frame region 116 in which the unnecessary subject region shown in FIG. 13 is not included.

Figure 15:
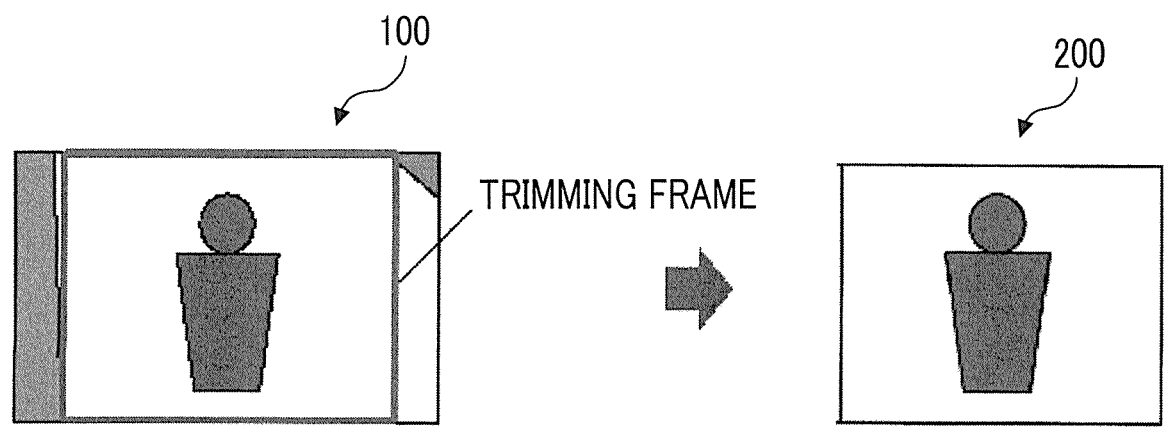
FIG. 15 is an explanatory diagram of trimming processing according to another exemplary embodiment.

FIG. 15 schematically shows processing for executing the trimming by calculating the trimming frame based on the frame region 118 shown in FIG. 14 and applying the calculated trimming frame to the input image 100. In a case where the output image 200 shown in FIG. 15 is compared with the output image 200 shown in FIG. 10, the output image 200 shown in FIG. 15 has a larger margin.

As described above, in this exemplary embodiment, the intended subject can be extracted from the input image such that the intended subject is not cut off and the unnecessary backgrounds or the unnecessary objects are not included.

Although it has been described in this exemplary embodiment that the image processing apparatus 30 is realized by the computer as shown in FIG. 2, the image processing apparatus may be realized by a single computer, or may be realized by a system using a plurality of computers connected via a communication network. For example, a server computer (cloud computer) and a terminal computer may be connected via a communication network, the input image is transmitted from the terminal computer to the server computer, the trimming processing is performed by the server computer to generate the output image, and the output image may be transmitted from the server computer to the terminal computer and may be displayed on a display unit of the terminal computer. In this case, the terminal computer may select the first detection method and the second detection method from among the plurality of detection methods, and may instruct the server computer to transmit the first detection method and the second detection method. The server computer may perform the processing by the instructed first detection method and second detection method, may perform the trimming processing on the input image, and may generate the output image. Alternatively, the server computer may be configured to perform the trimming processing using a plurality of combinations of the first detection method and the second detection method, and transmit a plurality of output images to the terminal computer. The terminal computer may be configured to select an intended output image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an input unit that inputs an image; and
a hardware processor configured to read out a program stored in a memory, and executes the program,
wherein the hardware processor is configured to
detect an intended subject from the input image by a first detection method, set an intended subject region for the detected intended subject,
detect the intended subject from the input image by a second detection method different from the first detection method, and
update the set intended subject region by using a detection result of the second detection method,
wherein the hardware processor is configured to detect a salient region from the input image, as the second detection method, and update the set intended subject region by expanding the set intended subject region by using the salient region,
wherein the hardware processor is configured to limit an expansion range of the intended subject region by the detection result, and decide an upper limit of the expansion, and
wherein the hardware processor is configured to expand the intended subject region by adding pixels which are adjacent to the intended subject region and are detected in the detection result to pixels of the intended subject region.

2. The image processing apparatus according to claim 1, wherein the hardware processor is configured to binarize the input image, as the second detection method.

3. The image processing apparatus according to claim 2, wherein the hardware processor is configured to update the set intended subject region by expanding the set intended subject region by using a binarization result.

4. The image processing apparatus according to claim 1, wherein the hardware processor is configured to detect a salient region indicating a degree of attention of a person from the input image and binarize the input image, as the second detection method.

5. The image processing apparatus according to claim 4, wherein the hardware processor is configured to update the set intended subject region by using the salient region and a binarization result.

6. The image processing apparatus according to claim 5, wherein the hardware processor is configured to update the set intended subject region by expanding the set intended subject region by using the salient region and further calculating a logical sum of a binarization region of the binarization result and the set intended subject region.

7. The image processing apparatus according to claim 1, wherein the hardware processor is configured to further set an unnecessary subject region from the input image by using the detection result of the second detection method and the updated intended subject region.

8. The image processing apparatus according to claim 7, wherein the hardware processor is configured to further update the updated intended subject region by using the unnecessary subject region.

9. The image processing apparatus according to claim 1, wherein the hardware processor is configured to further set a cutout region from the updated intended subject region, and cut out the intended subject from the input image by using the cutout region.

* * * * *